US012743387B2

(12) United States Patent
Lee et al.

(10) Patent No.: US 12,743,387 B2
(45) Date of Patent: Sep. 22, 2026

(54) LOW-LATENCY CONTROL INTERFACE AND PROTOCOL

(71) Applicant: QUALCOMM Incorporated, San Diego, CA (US)

(72) Inventors: Gordon Lee, Gilbert, AZ (US); Vijayakumar Ashok Dibbad, Bangalore (IN); Louis Louie, San Diego, CA (US); Chris Rosolowski, Encinitas, CA (US); Jennifer Hagstrom, San Diego, CA (US); Todd Robert Sutton, Del Mar, CA (US); Orlando Santiago, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 25 days.

(21) Appl. No.: 18/829,936

(22) Filed: Sep. 10, 2024

(65) Prior Publication Data

US 2026/0072859 A1 Mar. 12, 2026

(51) Int. Cl.
*G06F 13/24* (2006.01)
*G06F 13/10* (2006.01)

(52) U.S. Cl.
CPC .............. *G06F 13/24* (2013.01); *G06F 13/10* (2013.01); *G06F 2213/24* (2013.01)

(58) Field of Classification Search
CPC .................................................... G06F 16/955
See application file for complete search history.

(56) References Cited

U.S. PATENT DOCUMENTS 5,213,555 A 5/1993 Hood et al.
6,816,750 B1 * 11/2004 Klaas .................. G06F 15/7832 700/121
10,572,439 B1 * 2/2020 Graif .................. G06F 13/4291
2014/0047150 A1 * 2/2014 Marietta ............... G06F 9/5077 710/264
2015/0268678 A1 * 9/2015 Yu ............................ G05F 1/46 327/540

OTHER PUBLICATIONS

International Search Report and Written Opinion PCT/US2025/036842 ISA/EPO Oct. 7, 2025.

* cited by examiner

*Primary Examiner* — Henry Tsai
*Assistant Examiner* — Juanito C Borromeo
(74) *Attorney, Agent, or Firm* — LOZA & LOZA, LLP

(57) ABSTRACT

Aspects of the disclosure relate to power management of a system-on-chip (SoC) and techniques of optimizing system performance and power management through power limits coordination via a low latency bus interface that provides a flexible protocol which enables high priority messages to facilitate power management. The protocol enables shallow power mitigation techniques to reduce the need of full mitigation of the apparatus.

18 Claims, 11 Drawing Sheets

900

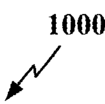

Receive an interrupt message from a peripheral device among the plurality of peripheral devices using an interrupt protocol, wherein a payload of the interrupt protocol comprises a plurality of timeslots that are respectively pre-assigned to a plurality of alert events associated with the plurality of peripheral devices, wherein the interrupt message is inserted in a pre-assigned timeslot of the plurality of timeslots corresponding to the alert event among the plurality of alert events

FIG. 10

LOW-LATENCY CONTROL INTERFACE AND PROTOCOL

TECHNICAL FIELD

The technology discussed below relates generally to a lower-latency control interface of a system-on-chip (SoC), and more particularly, to a low-latency power management control interface and protocol for an SoC.

INTRODUCTION

System-on-chip (SoC) technology has emerged as a key component in computing devices and mobile devices. SoC technology can integrate a large amount of functionality with heterogeneous devices on a single semiconductor device, for example, central processing units (CPUs), graphic processing units (GPUs), neural signal processors (NSPs), digital signal processors (DSPs), Double Data Rate Synchronous Dynamic Random-Access Memory (DDR SDRAM), hardware accelerators, fixed function accelerators, etc. An SoC can reduce the overall system size and cost as many components can be included on the same chip and internally connected. Performance metrics on the processing cores (e.g., GPU, CPU, NSP) are important in the SoC. Stable system performance demands power margins be maintained such that peak loading at processing cores does not outstrip allocated power supplies. Various power management schemes can be used to coordinate performance throttling of different cores for thermal robustness or when one or more power regulators are in jeopardy of exceeding limits.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some aspects, a system-on-chip (SoC) can include one or more processors and a bus interface connecting the one or processors with a plurality of peripheral devices. In one example, a peripheral device can include a power management integrated circuit (PMIC). The bus interface is configured to receive an interrupt message from a peripheral device among the plurality of peripheral devices using an interrupt protocol, wherein a payload of the interrupt protocol includes a plurality of timeslots that are respectively pre-assigned to a plurality of alert events associated with the plurality of peripheral devices. The interrupt message is inserted in a pre-assigned timeslot of the plurality of timeslots corresponding to the alert event among the plurality of alert events. In one example, the alert events include a plurality of power management events.

Another example provides a method of operating a bus interface of a system-on-chip (SoC). The method includes a process of controlling a regulator to supply power to a system-on-chip (SoC). The method includes a process of receiving an interrupt message from the a peripheral device among a plurality of peripheral devices using an interrupt protocol, a payload of the interrupt protocol including a plurality of timeslots that are respectively pre-assigned to a plurality of alert events associated with the plurality of peripheral devices, the interrupt message inserted in a pre-assigned timeslot of the plurality of timeslots corresponding to the alert event among the plurality of alert events.

Another example provides an apparatus including a system-on-chip (SoC) and a power management integrated circuit (PMIC). The PMIC is configured to control a regulator to supply power to the SoC. The PMIC is further configured to communicate with the SoC using an interrupt protocol, wherein a payload of the interrupt protocol includes a plurality of timeslots respectively pre-assigned to a plurality of power management events. The PMIC is further configured to send an interrupt message to the SoC, wherein the interrupt message is inserted in a pre-assigned timeslot of the payload corresponding to a power management event among the plurality of power management events.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIG. 10 is a diagram illustrating an exemplary method for operating a low-latency bus interface at an SoC according to some aspects.

DETAILED DESCRIPTION

Figure 1:
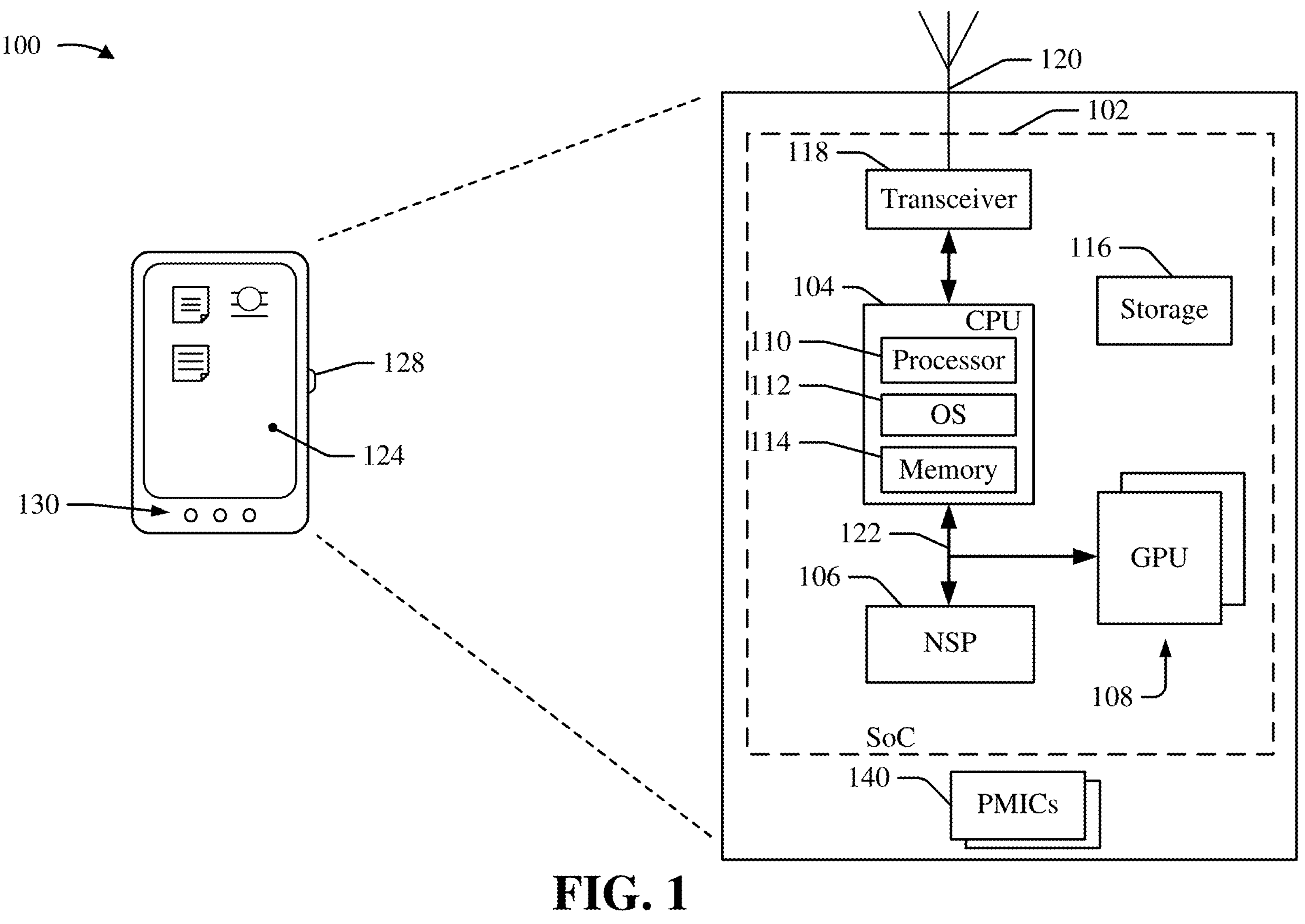
FIG. 1 is a diagram depicting an apparatus employing a system-on-chip (SoC) according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, firmware, or any combination thereof. Whether such elements are implemented as hardware or software depends upon the particular application and design constraints imposed on the overall system.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of described examples. It is intended that innovations described herein may be practiced in a wide variety of devices, chip-level components, systems, distributed arrangements, end-user devices, etc., of varying sizes, shapes, and constitution.

A computing apparatus, such as a mobile device (e.g., user equipment (UE)), may include a system-on-chip (SoC), which may include a plurality components, for example, a central processing unit (CPU), a graphics processing unit (GPU), a neural signal processor (NSP), a transceiver, a modem, a digital signal processor (DSP), dynamic random access memory (DRAM), synchronous DRAM (SDRAM), etc. An SoC can include one or more power management integrated circuits (PMICs) to control power delivery to various components (e.g., CPU, GPU, NSP, etc.) and circuitry of the SoC. Each PMIC can manage power through one or more regulators tailored to different parts or power domains of the SoC. Each power domain can be responsible for a specific voltage or current requirement, catering to distinct blocks or subsystems in the SoC. Each PMIC can control one or more power domains. In one example, the apparatus can use a first power domain to control power delivery to the cores (e.g., CPU, GPU) and other processing units, a second power domain to control power delivery to peripherals, a third power domain to control power delivery to various types of memory (e.g., SRAM, DRAM), etc.

In this disclosure, the term PMIC refers to an integrated circuit or solid state device that performs various functions related to power management. A PMIC may provide one or more of the following functions, for example, DC-to-DC conversion, battery charging, power-source selection, voltage scaling, power sequencing, etc. The PMIC controls the flow and direction of electrical power in the system.

In a power domain, the PMIC can control the delivery of one or more variable voltages and/or currents to various components (e.g., CPU, GPU, NSP, peripherals, etc.). In one example, the PMIC can use dynamic voltage scaling (DVS) to adjust the supplied voltage based on processing demands. In another example, the PMIC can use one or more voltage regulators (e.g., switching regulators) to supply power to the various components. Some exemplary regulators are buck regulators. A buck regulator can efficiently step down a voltage for a component that requires stable power, but varies significantly in power requirements. A fast transient response (FTS) buck regulator is a type of DC-to-DC switching regulator designed to quickly respond to changes in load current or input voltage while maintaining a stable output voltage. For example, the buck regulator can handle high power cores and peripherals like USB controllers and wireless modules.

In some examples, an apparatus can use current limit extension techniques to provide extra power capacity from a regulator (e.g., FTS buck regulator) for a limited time to better support highly dynamic loads on one or more cores. In some examples, a PMIC can send current limit extension interrupts via a System Power Management Interface (SPMI) with priority to alert the SoC when performance throttling needs to be started and when unthrottled performance can be restored. In this case, worst-case SPMI latencies for limits coordination will determine how much margin needs to be carried for the design. In some examples, even high priority SPMI messages can take about ten seconds or even more to start throttling. The resulting potential voltage rail droop necessitates an aggressive mitigation response.

A regulator (e.g., FTS buck regulator) is designed to quickly adapt to changes in load current or input voltage. In some cases, the regulator can be overloaded to the point where its output voltage begins to sag (i.e., loss of regulation), and the self-protection foldback control scheme can be triggered. In extreme overload conditions, the communication latency of activating foldback can be too long to avoid likely crash of the core. Foldback is a protection mechanism that reduces the output current of the regulator in response to excessive load or a fault condition, such as a short circuit. To reduce the chance of system instability or undesirable performance gyrations, the maximum operating frequency of the cores can be limited to ensure margin is preserved for variances across SoC devices, PMICs operation conditions, and manufacturing spreads. In some cases, extra power supply capacity has to be added, thus increasing the cost and size of the solution.

Aspects of present disclosure provide techniques to address the above-mentioned challenges to optimize system performance and power management through power limits coordination via a low latency bus interface that provides a flexible protocol which enables high priority messages to facilitate power management. In some aspects, the protocol enables shallow power mitigation techniques to reduce the need of full mitigation of the apparatus.

FIG. 1 is a diagram depicting an apparatus employing a system-on-chip (SoC) according to some aspects. In one example, the apparatus 100 may include a radio communication device that communicates through a radio frequency (RF) communications transceiver 118 with a radio access network (RAN), a core access network, the Internet and/or another network. The communications transceiver 118 may be embodied in, or operably coupled to an SoC 102 (the former being illustrated). The SoC 102 may include various components including various processing cores (e.g., CPU 104, NSP 106, and GPU(s) 108). In one example, the CPU 104 may include one or more processors 110 and memory 114 (e.g., L1 and/or L2 caches or registers or RAM), and may be controlled by an operating system 112 that is loaded from internal or external storage as data and instructions that are executable by the processor 110. The SoC 102 may further include or access a local storage 116, which can be used to maintain operational parameters and other information (e.g., database) used to configure and operate the apparatus 100. The local storage 116 may be implemented as a set of registers, or may be implemented in flash memory, magnetic media, non-volatile or persistent storage, optical media, tape, soft or hard disk, or the like. The SoC 102 may also be operably coupled to internal and/or external devices such as an antenna 120, a display/user interface 124, operator controls, such as buttons 128, 130, and other components.

A data communication interface (e.g., bus) 122 may be provided to support communication between the various components 104, 106, 108, and/or one or more peripherals (not shown). The data communication interface 122 may be operated in accordance with standard protocols defined for interconnecting certain components of mobile devices. For example, there may be multiple types of interfaces defined for communications between CPU 104, a user interface, and camera components of a mobile device. In some aspects, the apparatus 100 has one or more PMICs 140, each controlling one or more power domains. Each PMIC manages power delivery in a power domain through one or more regulators tailored to that power domain. For example, different PMICs can manage power of different cores or processors (e.g., CPU 104, NSP 106, and GPU 108).

Figure 2:
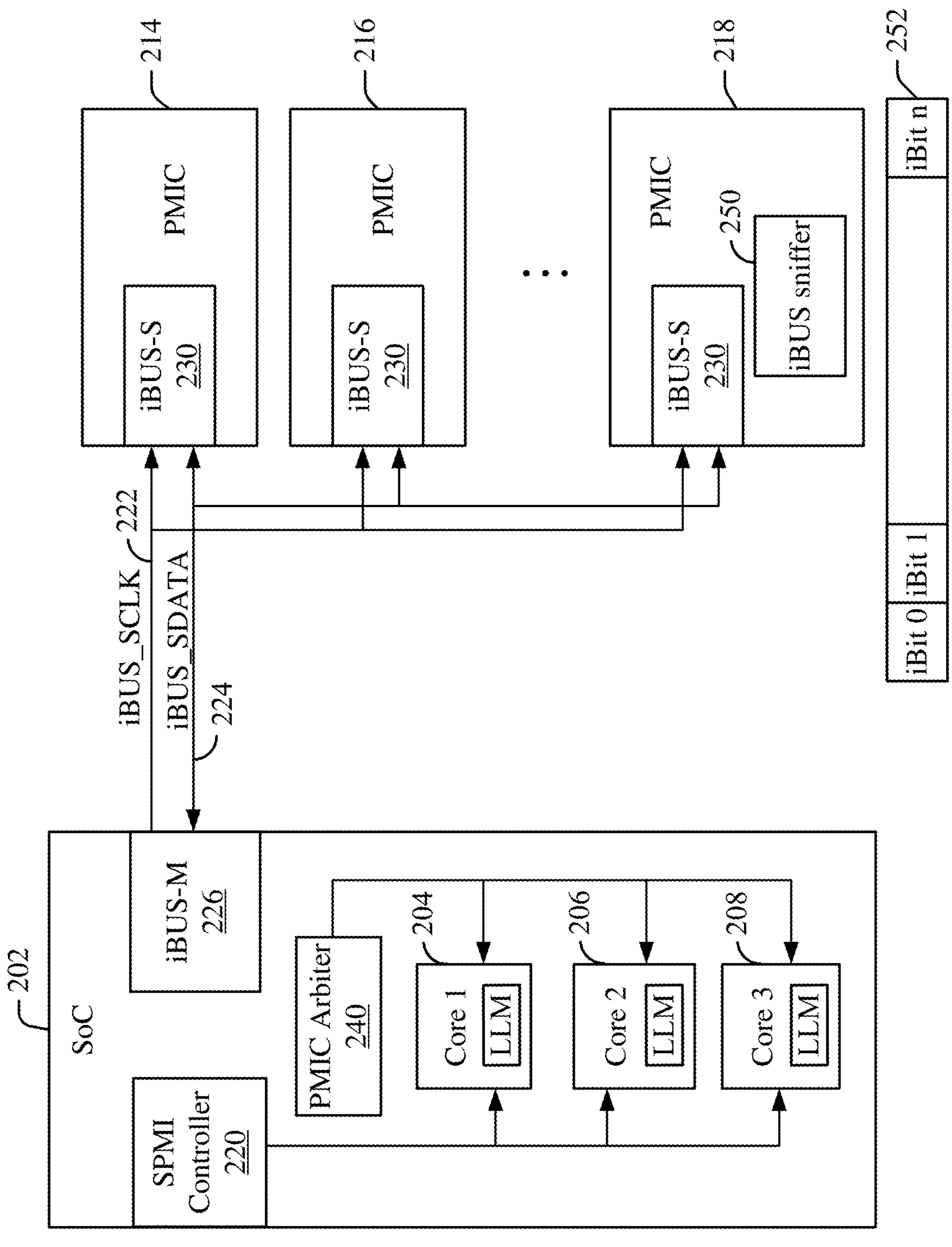
FIG. 2 is a diagram depicting an exemplary system-on-chip (SoC) and power management integrated circuits (PMICs) according to some aspects.

FIG. 2 is a diagram depicting an exemplary SoC and PMICs according to some aspects. The SoC 202 may be implemented on a device or apparatus configured to run various applications. For example, the device may be a mobile phone, a tablet computer, or other suitable mobile device capable of running one or more applications.

The SoC 202 can include multiple processing cores (e.g., a first core 204, a second core 206, and a third core 208). In some examples, the first core can be a CPU, the second core can be a GPU, and the third core can be a NPU. The SoC 202 can be connected to one or more peripheral devices. For example, the peripheral devices can include PMICs (e.g., PMIC 214, 216, 218 shown in FIG. 2) that control power delivery to different power domains including the SoC. The Soc 202 has an SPMI controller 220 that enables the SoC to communicate with the PMICs using the SPMI communication protocol for control and data transfer between the PMICs and SoC. SPMI provides a standardized interface for power control and monitoring. In some aspects, the SoC can also connect to the PMICs using a low latency interrupt interface (iBUS) that has lower interrupt latency than the SPMI. The iBUS can work alongside the SPMI for improved power management of the SoC. The iBUS interface uses a two-wire bus including a clock line 222 (iBUS_SCLK) and a data line 224 (iBUS_SDATA). The iBUS clock is driven by an iBUS master interface 226 (shown as iBUS-M in FIG. 2), as needed, located at the SoC. The iBUS connects the iBUS master interface 226 to the iBUS slave interface 230 included in each PMIC. The iBUS interface is a dedicated low-latency interrupt bus that can complement the SPMI interface. The iBUS interface enables tighter coordination between PMIC and high-performance cores as well as improved battery current limit (BCL) response time than using SPMI. In some aspects, the iBUS slave interface 230 can also include an SPMI interface for communicating with the SoC's SPMI controller 220 using the SPMI protocol. In some examples, the PMIC can include an SPMI interface that is separated from the iBUS slave interface 230.

In some aspects, the SoC includes a PMIC arbiter 240 that receives iBUS messages from the PMICs using the iBUS (e.g., via iBUS-M 226). The iBUS messages can include alerts (e.g., interrupts) from the PMICs that requests the SoC to take action to reduce or mitigate power consumption of the device. The PMIC arbiter 240 can distribute the alerts to corresponding subsystem limit management blocks of the processing cores as the alerts are received. For example, the alerts can be distributed to the limit management block (LLM) in each of the cores (e.g., first core 204, second core 206, and third core 208). The LLM can be implemented as a hardware and/or software component responsible for monitoring, regulating, and enforcing power and thermal limits to ensure the safe and efficient operation of the processing core. For example, the LLM can adjust the voltage and/or frequency of the core dynamically based on current workload and thermal conditions to optimize performance and power efficiency. In one example, the LLM can lower the voltage and/or frequency of the core to mitigate the load on a regulator that supplies power to the core.

In some aspects, the PMIC arbiter 240 does not need to wait for the entire iBUS payload to be completely received and decoded before the arbiter can distribute the alerts to the various cores, thus keeping latency low particularly for the earlier bits in the iBUS payload. The iBUS payload includes multiple bit positions (e.g., iBITs), each corresponding to an alert (if present) from one of the PMICs. For example, front-loading the highest priority interrupt in the first bit (e.g., iBIT0) position at the start of the payload can reduce latency (e.g., about 170 ns) for the first bit in the payload as compared to using SPMI communication. The lower latency of the iBUS protocol enables the PMIC arbiter 240 to perform shallower mitigation to reduce power consumption of the system, as compared to cases when SPMI interrupts are used. For example, an alert in an iBUS message can cause the SoC to throttle a core for a shorter time period (e.g., shallow or micro mitigation) than using the SPMI interrupt method.

In some aspects, a PMIC (e.g., PMIC 218) can include an iBUS sniffer 250 that can be configured to trigger PMIC responses in reaction to bit patterns matched in the iBUS payload (iBITs). For example, the iBUS sniffer 250 can match the iBUS payload bits to a bit mask 252 (e.g., SNIFFER_MATCH_MASK). Each bit in the mask can correspond to one of the iBUS payload bits (e.g., iBIT 0 to iBIT n). In one example, a match occurs when all iBITs are matched (i.e., AND of all iBITs). In another example, a match occurs when any of the iBITs is matched (i.e., OR of all iBITs). When a match is confirmed, the PMIC can then send an interrupt (in iBUS message) to trigger a predetermined operation at the SoC. For example, the PMIC can send the interrupt to the SoC or a master PMIC (e.g., PMIC 214) to carry out the predetermined operation. In one example, the master PMIC can save a log of the iBUS events for later diagnostics or system performance tuning.

In some aspects, the iBUS protocol enables bi-directional communication using the iBUS. The iBUS master interface of the SoC can drive its own iBIT slots in the payload, thus enabling low latency communication from the SoC to PMICs with far lower latency than using the SPMI communication interface (e.g., SPMI controller 220).

Figure 3:
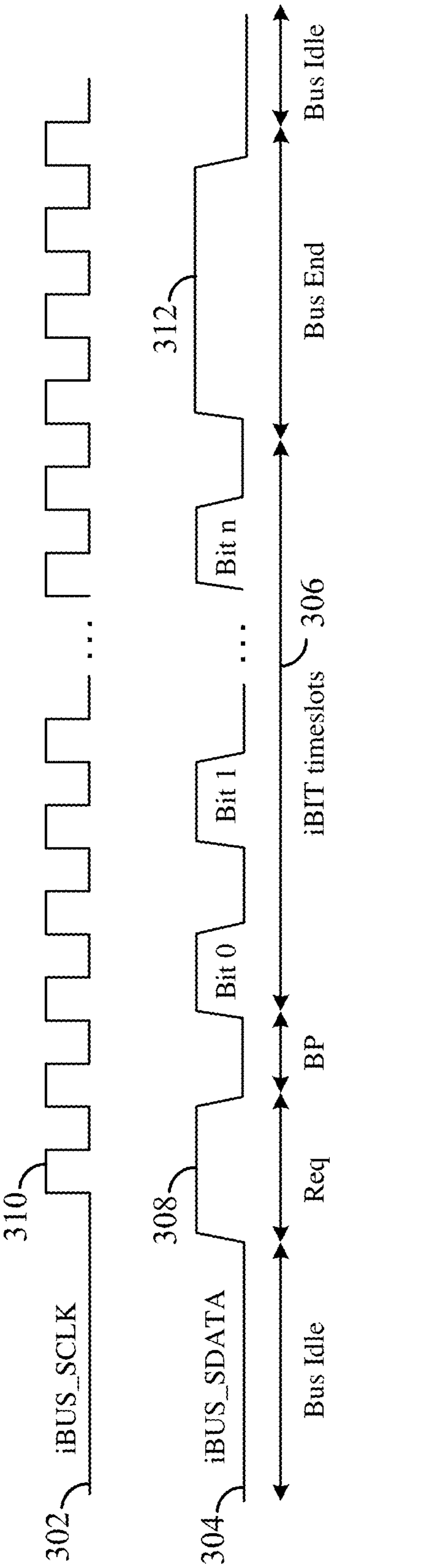
FIG. 3 is a diagram depicting exemplary waveforms illustrating an interrupt bus (iBUS) protocol according to some aspects.

FIG. 3 is a diagram depicting exemplary waveforms illustrating an iBUS protocol according to some aspects of the disclosure. The waveforms include the iBUS clock 302 (indicated as iBUS_SCLK in FIG. 3) and iBUS data 304 (indicated as iBUS_SDATA in FIG. 3). Using the iBUS protocol, each PMIC (e.g., using iBUS_S 220 of FIG. 2) can send alerts (e.g., interrupt messages) in a pre-assigned iBIT timeslot 306 (e.g., Bit 0, Bit 1, . . . , and Bit n) in the iBUS payload. The iBUS master interface (e.g., iBUS_M 226 of FIG. 2) starts the clock (iBUS_SCLK) when an iBUS slave interface (e.g., iBUS-S 230 of FIG. 2) at a PMIC requests iBUS access when the PMIC needs to send an interrupt. For example, the iBUS slave interface can raise the signal level (i.e., starting request period 308) on the iBUS_SDATA to request the iBUS master interface to start the clock. In response, the iBUS master interface starts the clock signal. Each PMIC iBUS slave interface monitors the clock pulses 310, and inserts its iBUS message (e.g., alert or interrupt), if needed, at the pre-assigned bit position or timeslot 306 (e.g., Bit 0, Bit 1, . . . , and Bit n) for the PMIC. Multiple bits from the different PMICs can be captured and combined in a single iBUS payload. Because the PMICs can insert the messages within a single capture window of the iBUS, the chance that a pending interrupt needs to wait for the next iBUS message can be reduced. The iBUS master interface receives messages bit-by-bit and can distribute the messages (interrupts) to the assigned cores (e.g., cores 204, 206, and 208 of FIG. 2) as soon as the corresponding iBITs are received. After receiving the complete payload, the iBUS master interface can broadcast an end indicator (e.g., Bus End 312) to complete the iBUS transaction. Then, the iBUS goes back to idle before re-arming in preparation for the next payload. At the SoC, the PMIC arbiter does not wait for the entire iBUS payload to be completely received and decoded before the arbiter can distribute the alerts or interrupts to the various cores, thus minimizing the bus latency, particularly for the first bit in the iBUS payload.

In some aspects, a PMIC message can indicate various kind of events, for example, a pre-current limit extension (PCLX) event, an imminent foldback flag (IFF) event, and a battery current limiting (BCL) event. A PCLX event indicates that the current output of a regulator has exceeded a current limit extension threshold for a predetermined amount of time. Current limit extension is a technique that provides extra power capacity from the regulator (e.g., FTS buck regulator) for a limited time to better support highly dynamic load execution. The IFF event indicates that the regulator voltage output has dropped below a threshold voltage (IFF voltage) that is set higher than a foldback threshold voltage. If the output voltage further drops to the foldback threshold voltage, the regulator performs foldback to protect itself from over current situations. The BCL event indicates that an emergency chip-wide throttling is needed to avoid brownouts of regulators that can lead to system wide crashing.

In some aspects, the iBUS and protocol described above can be applied to other applications where a low latency bus protocol is advantageous and useful. For example, the iBUS can connect the SoC with various other components that can send interrupts to the SoC over iBUS. In some aspects, the iBUS interface and protocol can be used for alert events of other nature beyond power management.

Figure 4:
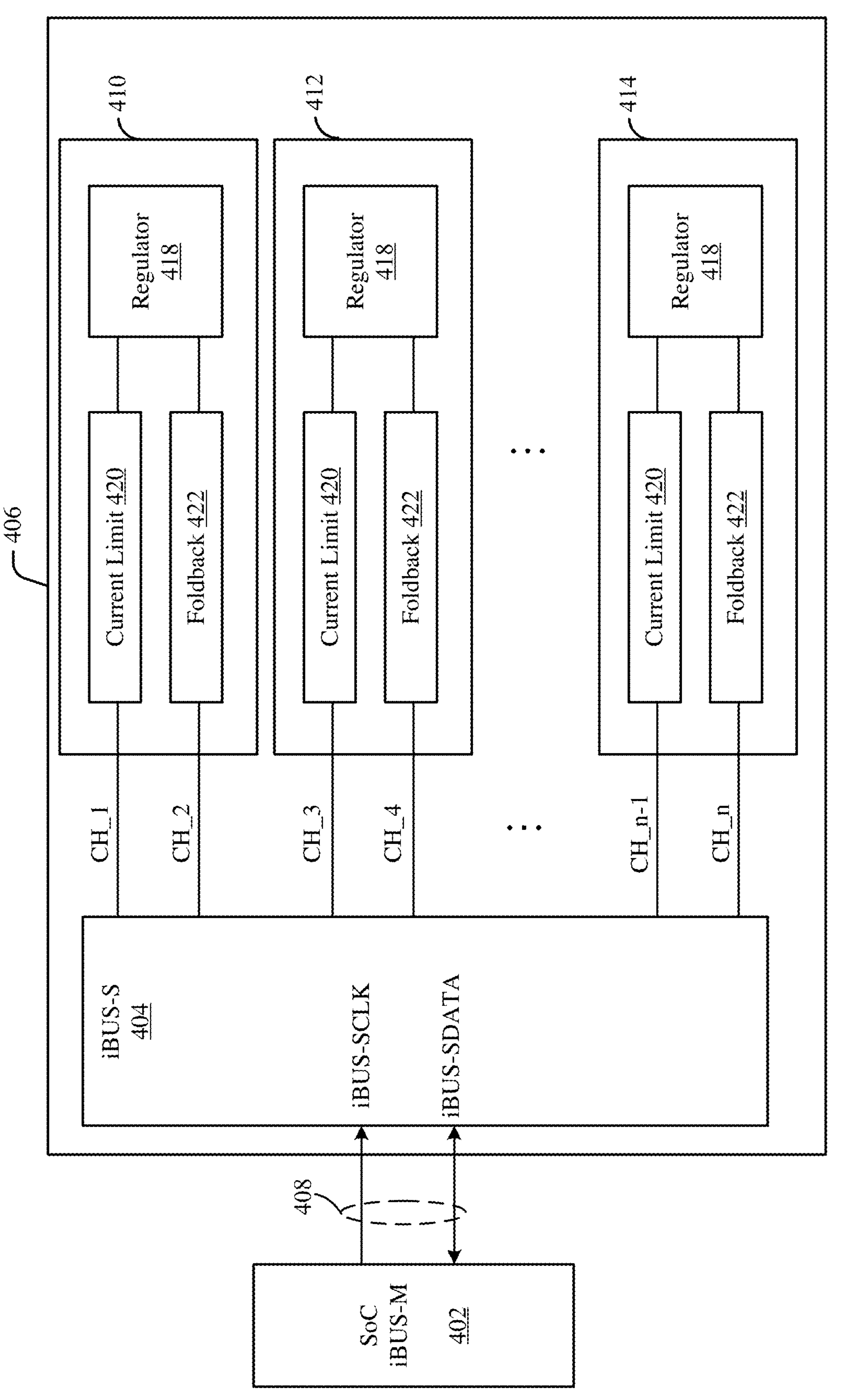
FIG. 4 is a diagram depicting an exemplary iBUS configuration of a PMIC according to some aspects.

FIG. 4 is a diagram depicting an exemplary iBUS configuration of a PMIC according to some aspects. An iBUS master interface 402 (iBUS-M at an SoC) can be connected to an iBUS slave interface 404 (iBUS-S at a PMIC 406) using an iBUS 408. In one example, the iBUS master interface 402 may be the same as the iBUS master interface 226 of FIG. 2. The iBUS slave interface 404 may be any of the iBUS slave interfaces 230 of FIG. 2. In one aspect, the iBUS slave interface 404 has a plurality of channels (CH_1, CH_2, . . . . CH_n−1, and CH_n) for receiving signals from one or more power circuits, for example, power circuits 410, 412, and 414. Each power circuit can include a regulator 418 (e.g., buck regulator, voltage regulator, etc.). In some examples, the power circuit can have more than one regulator. The power circuit can have current monitor circuitry 420 and foldback monitor circuitry 422 to monitor the output of the regulator. For example, the current monitor circuitry 420 monitors the output current of the regulator 418 and outputs a trigger signal (e.g., to indicate a pre-CLX (PCLX) event) when the current is greater than a predetermined threshold (current threshold) for a predetermined amount of time. The foldback monitor circuitry 422 monitors the output voltage of the regulator 418 and outputs a trigger signal (e.g., to indicate an IFF event) when the voltage is lower than a predetermined threshold (voltage threshold) for a predetermined amount of time. A PCLX event occurs when the output current is greater than a predetermined current threshold that is less than the CLX threshold current for a predetermined period of time. An IFF event occurs when the output voltage is lower than a predetermined threshold that is greater than a foldback threshold voltage for a predetermined period of time.

When the iBUS slave interface 404 receives one or more trigger signals from the channels, the iBUS slave interface can send high priority interrupts to the iBUS master interface 402 using an iBUS message as described above in relation to FIG. 3. The iBUS slave interface inserts the interrupt bits at the preassigned bit positions of the iBUS message or payload. The iBUS master interface 402 can receive and proceed the bit stream as each interrupt bit is received. For example, the signal received from CH_1 can be assigned to a first bit position, the signal received from CH_2 can be assigned to a second bit position, the signal received from CH_n can be assigned to a last bit position, and so on. This way, the iBUS master interface 402 does not need to wait for the complete iBUS payload before distributing the interrupts to the SoC's cores or LLMs.

Figure 5:
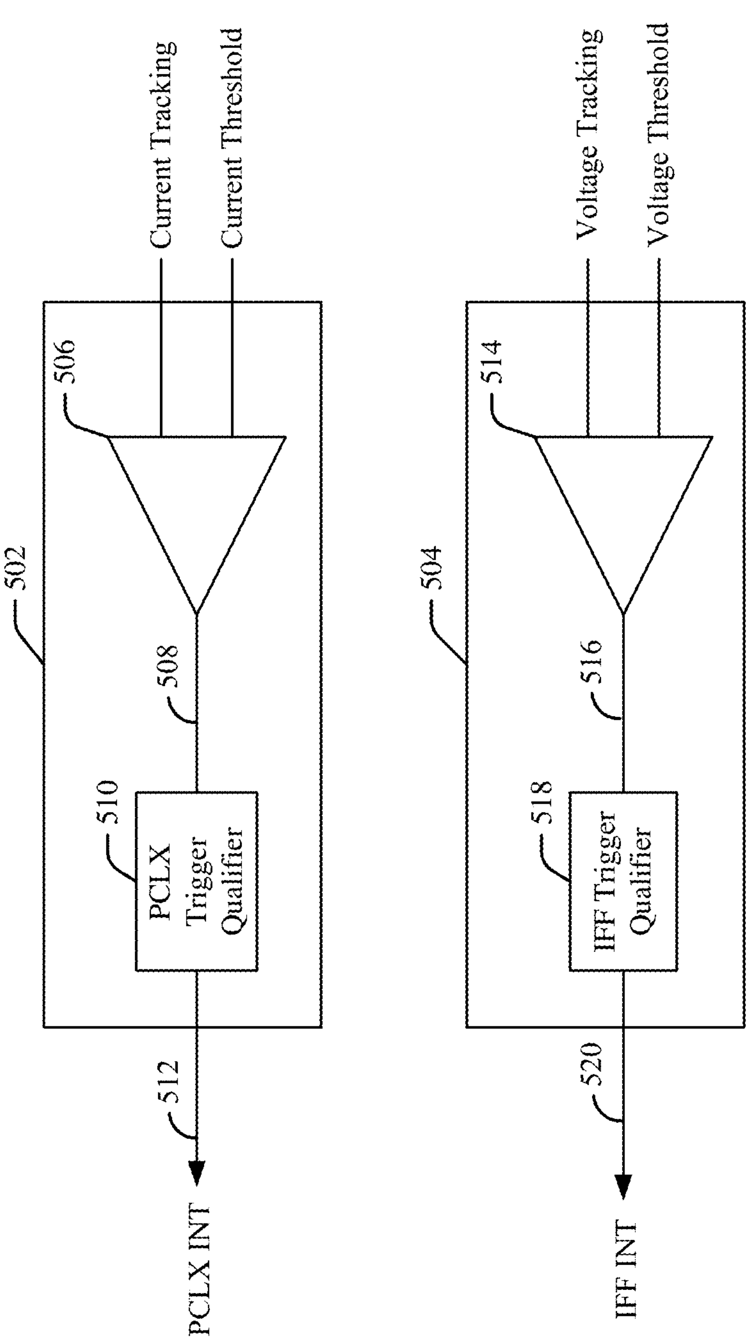
FIG. 5 is a diagram depicting exemplary current monitoring circuitry and voltage monitoring circuitry of a PMIC according to some aspects.

FIG. 5 is a diagram depicting exemplary current monitoring circuitry and voltage monitoring circuitry of a PMIC according to some aspects. The current monitoring circuitry 502 and voltage monitoring circuitry 504 can be included in any PMIC (e.g., PMIC 406 of FIG. 4). In one aspect, the current monitoring circuitry 502 can include a current comparator 506 that receives a current tracking signal and a current threshold signal. The current tracking signal indicates an output current level of a regulator (e.g., buck regulator) of the PMIC. The current comparator 506 can output a signal 508 that indicates whether or not the output current of the regulator is greater than the current threshold. The current threshold can be set to a level corresponding to a PCLX event. The current monitoring circuitry 502 can include a PCLX trigger qualifier 510 that outputs a PCLX interrupt signal 512 when the output current of the regulator is greater than the current threshold (e.g., PCLX threshold) for a predetermined about of time. For example, the PCLX trigger qualifier 510 can use a timer to measure the duration of time when the output current of the regulator is greater than the PCLX threshold.

The voltage monitoring circuitry 504 includes a voltage level comparator 514 that receives a voltage tracking signal and a voltage threshold signal. The voltage tracking signal indicates an output voltage of a regulator (e.g., buck regulator) of the PMIC. The voltage level comparator 514 outputs a signal 516 that indicates whether or not the output voltage of the regulator is lower than the voltage threshold. The voltage threshold can be set to a level corresponding to an IFF event. The voltage monitoring circuitry 504 includes an IFF trigger qualifier 518 that outputs an IFF interrupt signal 520 when the output voltage of the regulator is lower than the voltage threshold for a predetermined period of time. For example, the IFF trigger qualifier 518 can use a timer to measure the duration of time when the output voltage of the regulator is lower than an IFF threshold voltage.

When an iBUS slave interface (e.g., iBUS-S 404 of FIG. 4) receives the PCLX interrupt signal and/or IFF interrupt signal, the iBUS slave interface can request the iBUS master interface to start a iBUS clock so that the iBUS slave interface can send the interrupts to the PMIC arbiter 240 (see FIG. 2) of the SoC using the iBUS. If an ongoing iBUS capture window (e.g., timeslot 306 of FIG. 3) is available on the iBUS, the iBUS slave interface can insert the interrupt in the pre-assigned timeslot if possible without requesting or waiting for a new iBUS cycle. However, if the iBUS slave interface missed the current assigned bits of the capture window, the iBUS slave interface can request a new iBUS cycle as described above in FIG. 3.

Figure 6:
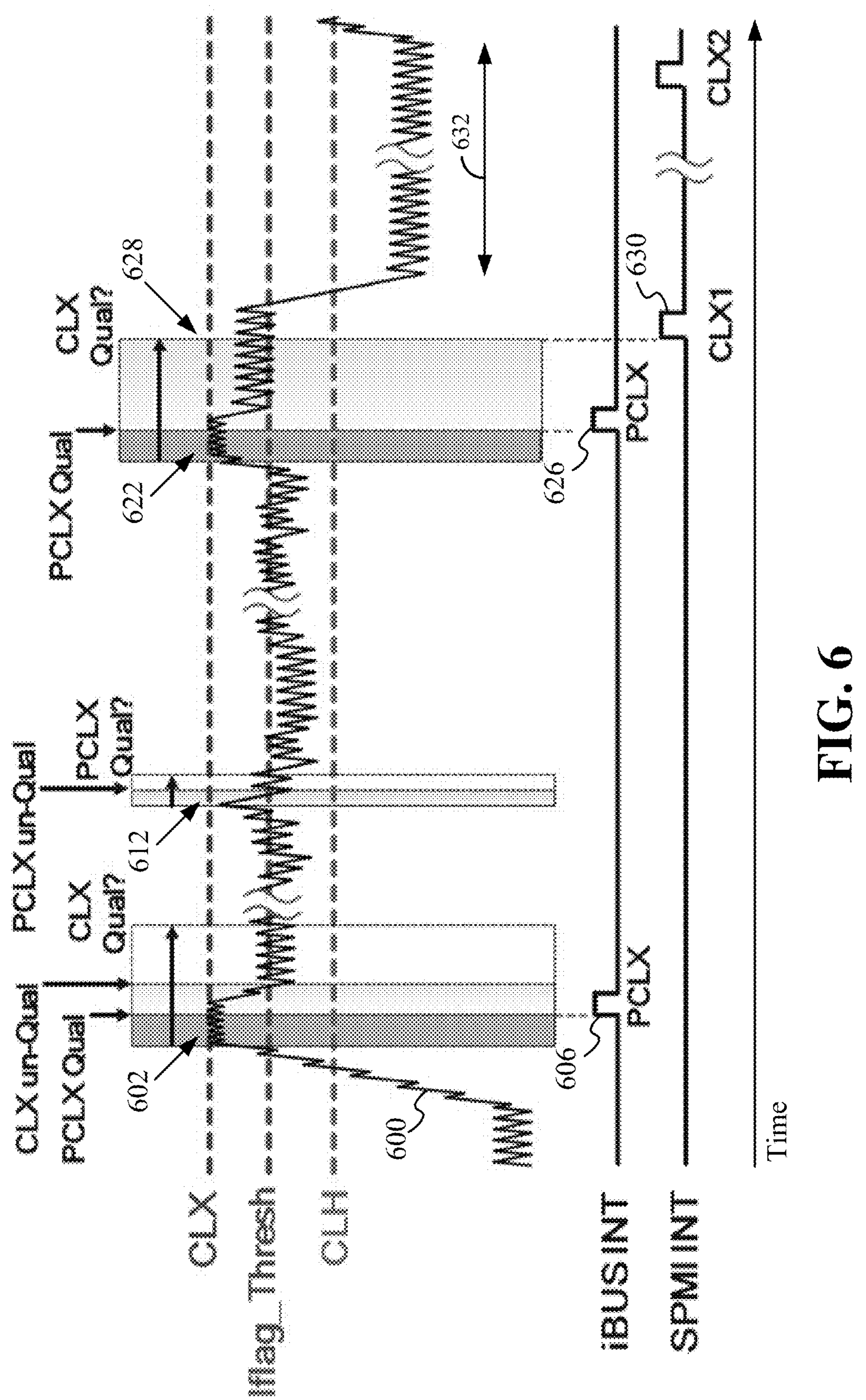
FIG. 6 diagram depicting a first exemplary mitigation procedure using the iBUS according to some aspects.

FIG. 6 is a diagram depicting a first exemplary shallow mitigation procedure using the iBUS described above according to some aspects. The output current 600 of a regulator (e.g., regulator 418 of FIG. 4) is illustrated in FIG. 6 over a period of time. In one example, the current 600 can be monitored using the current monitoring circuitry 502 of FIG. 5.

In a first instant, when the current 600 is greater than a threshold current level (shown as iflag_Thresh in FIG. 6) for a duration 602 longer than a shallow mitigation qualifying period (shown as PCLX Qual in FIG. 6), the current monitoring circuitry generates an iBUS interrupt (INT) 606 (shown as PCLX in FIG. 6) that can be inserted into a pre-assigned bit in an iBUS message (e.g., iBIT timeslots 306 of FIG. 3). The iBUS interrupt 606 (PCLX) causes the SoC (e.g., PMIC arbiter 240 of FIG. 2) to perform shallow mitigation (e.g., throttling of one or more cores) to reduce the loading of the regulator. If the shallow mitigation successfully reduces the current below the shallow mitigation threshold level before a full mitigation qualifying period (shown as CLX Qual in FIG. 6) is lapsed, no full mitigation is needed. In this case, the SoC does not need to perform a full mitigation. In a second instant, when the output current of the regulator is greater than the shallow mitigation threshold level (shown as iflag_Thresh in FIG. 6) for a duration 612 that is not longer than the shallow mitigation qualifying period, no mitigation is needed.

In a third instant, when the output current 600 of the regulator is greater than the shallow threshold level (iflag_Thresh) for a duration 622 longer than a shallow mitigation qualifying period, the current monitoring circuitry generates an iBUS interrupt (shown as PCLX 626 in FIG. 6) that is inserted into a pre-assigned bit in an iBUS message (e.g., iBIT timeslots 306 of FIG. 3). The iBUS interrupt 626 causes the SoC to perform shallow mitigation (e.g., throttling of one or more cores) to reduce the loading of the regulator. When the shallow mitigation cannot reduce the current level below the shallow mitigation threshold level before a full mitigation qualifying period 628 (shown as CLX Qual in FIG. 6) is lapsed, the current monitoring circuitry can sent an SPMI interrupt 630 (shown as CLX1 in FIG. 6) to the SoC. The SoC can perform a full mitigation in response to the SPMI interrupt. During full mitigation, the SoC can further reduce its load on the regulator to keep the output current level below a cool down threshold level (shown as CLH in FIG. 6) for a cool down period 632. In some aspects, the duration 602 (e.g., 3 microseconds (μs)) for qualifying a shallow mitigation response can be significantly shorter than the duration 628 (e.g., 13 μs) for qualifying a full mitigation response. Furthermore, the shallow mitigation response time (e.g., 6 μs) using an iBUS interrupt is significantly shorter (e.g., 20× or more faster) than the full mitigation response time (e.g., 126 μs) using an SPMI interrupt. Therefore, the iBUS triggered shallow mitigation has less impact on system performance than SPMI triggered full mitigation.

Figure 7:
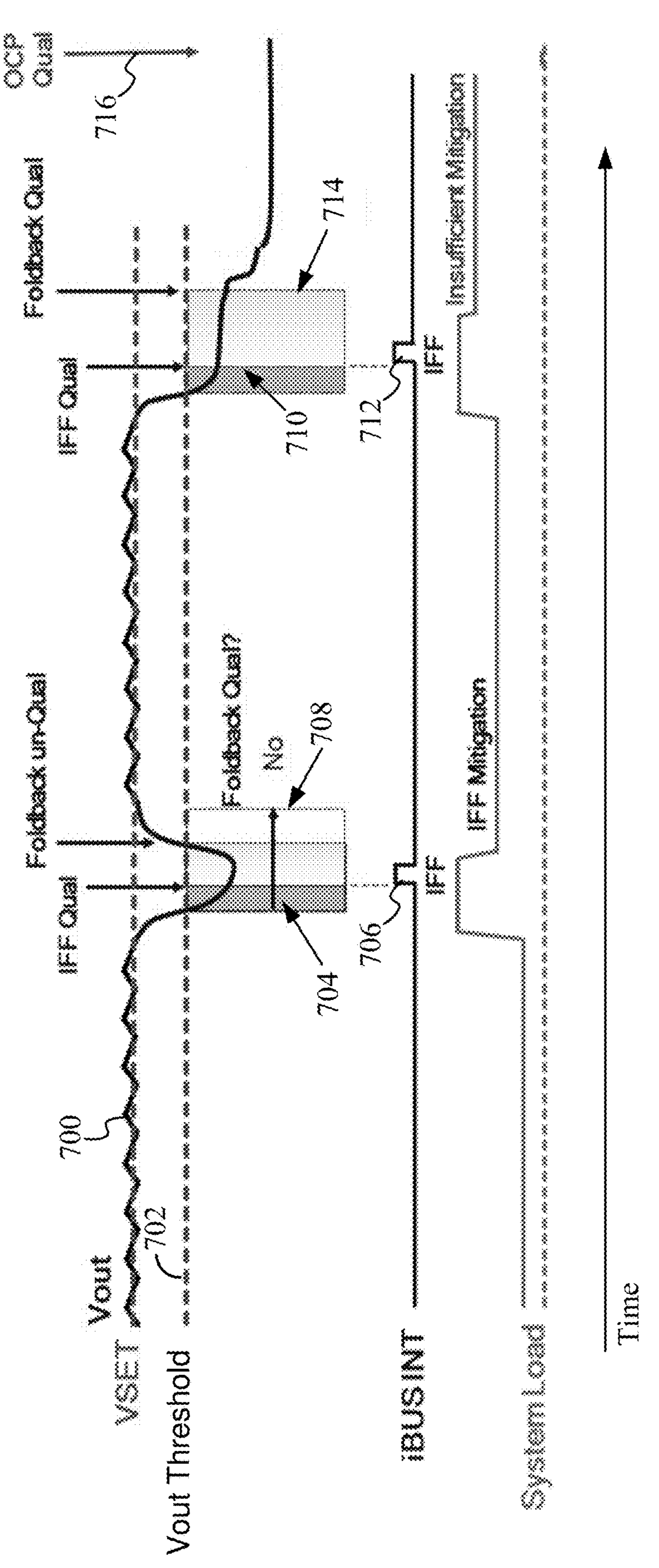
FIG. 7 is a diagram depicting a second exemplary mitigation procedure using the iBUS according to some aspects.

FIG. 7 is a diagram depicting a second exemplary mitigation procedure using the iBUS described above according to some aspects. The output voltage 700 of a regulator (e.g., regulator 418 of FIG. 4) is illustrated in FIG. 7 over a period of time. In one example, the output voltage of the regulator can be monitored using the voltage monitoring circuitry 504 of FIG. 5.

In a first instant, when the output voltage drops below a threshold level 702 (shown as Vout threshold in FIG. 7) for a duration longer than an imminent foldback (IFF) qualifying period 704 (shown as IFF Qual in FIG. 7), the voltage monitoring circuitry generates an iBUS interrupt 706 (shown as IFF in FIG. 7) that can be inserted into a pre-assigned bit in an iBUS payload. The iBUS interrupt 706 causes the SoC (e.g., PMIC arbiter 240 of FIG. 2) to perform shallow mitigation (e.g., IFF mitigation) to reduce the system loading of the regulator. For example, the SoC can reduce the voltage and/or frequency of a core to reduce its load on the regulator. If the shallow mitigation successfully causes the voltage level to rise above the threshold level before a full foldback qualifying period 708 (shown as Foldback Qual in FIG. 7) is lapsed, no further mitigation is needed. In this case, the SoC does not need to perform a full mitigation (e.g., foldback).

In a second instant, when the output voltage is below the shallow mitigation threshold level for a duration longer than a shallow mitigation qualifying period 710 (shown as IFF Qual in FIG. 7), the voltage monitoring circuitry generates an iBUS interrupt 712 (shown as IFF in FIG. 7) that can be inserted into a pre-assigned bit in an iBUS message. The iBUS interrupt 712 causes the SoC to perform shallow mitigation to reduce the load on the regulator. If the shallow mitigation cannot cause the voltage level to raise above the threshold level (Vout in FIG. 7) before a full foldback qualifying period 714 (shown as Foldback Qual in FIG. 7) is lapsed, the SoC performs a full mitigation (e.g., foldback) until the output voltage of the regulator can raise above the threshold level. When full mitigation (e.g., foldback operation) still cannot increase the output voltage of the regulator above the threshold, the SoC (e.g., PMIC) may trigger overcurrent protection (OCP) 716 (shown as QCP Qual in FIG. 7) to protect the regulator and/or the SoC. For example, the regulator can shut off its output to prevent any further current from flowing until the fault condition is removed or the system/regulator is reset.

Figure 8:
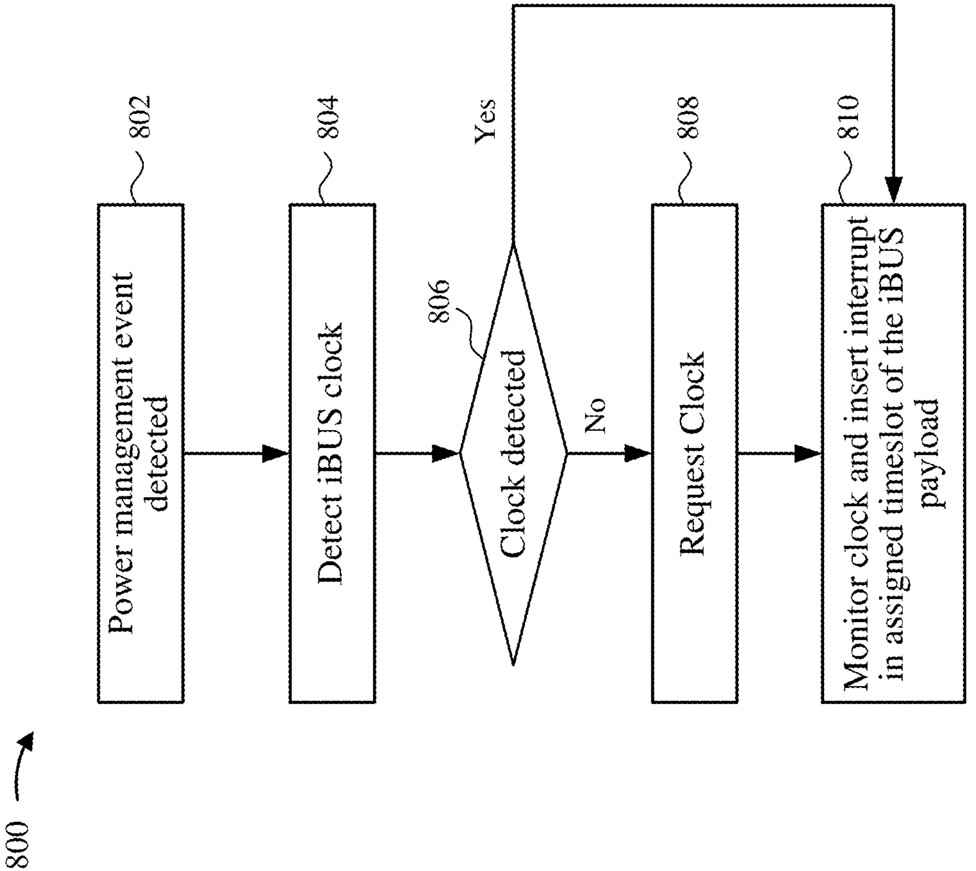
FIG. 8 is a diagram depicting an exemplary process for sending an interrupt using the iBUS protocol according to some aspects.

FIG. 8 is a diagram illustrating a process 800 for sending an interrupt using the iBUS protocol according to some aspects. In some examples, the procedure 800 can be carried out at the PMIC 406 illustrated in FIG. 4. In some examples, the procedure 800 can be performed using by any suitable apparatus or means for carrying out the functions or algorithm described below to send an iBUS interrupt.

At block 802, the PMIC can detect a power management event. For example, the power management event can be a pre-current limit extension (PCLX) event, an imminent foldback flag (IFF) event, or a battery current limiting (BCL) event. After the detection of the power management event, the PMIC can send an interrupt to the SoC to perform a power mitigation procedure corresponding to the power management event. In one aspect, the power mitigation procedure can be a shallow mitigation procedure. For example, the PMIC can use the iBUS to send the interrupt according to the iBUS protocol described above in relation to FIG. 3.

At block 804, the PMIC detects a clock (e.g., clock 302 of FIG. 3) on the iBUS clock line (e.g., iBUS_SCLK 222 of FIG. 2). The iBUS clock is driven by the iBUS master interface (e.g., iBUS master interface 226 of FIG. 2) as needed. The iBUS master (e.g., iBUS_M 226 of FIG. 2) starts the iBUS clock when any iBUS slave (e.g., iBUS-S 230 of FIG. 2) at a PMIC requests the bus when there is an interrupt to be sent.

At block 806, the PMIC determines whether or not the clock is detected. At block 808, when the iBUS clock is not detected, the PMIC requests the iBUS master interface of the SoC to start the iBUS clock. For example, the iBUS slave interface (e.g., iBUS-S 404 of FIG. 4) of the PMIC can send a request to the iBUS master interface (e.g., iBUS-M 402 of FIG. 4) of the SoC to start the clock. For example, the iBUS slave interface can request the iBUS clock by raising the signal level on iBUS data line (e.g., iBUS_SDATA 224 of FIG. 2).

At block 810, when the iBUS clock is detected, the iBUS slave interface of the PMIC monitors the clock and inserts the interrupt in the pre-assigned timeslot of the iBUS payload. For example, the iBUS payload includes a plurality of timeslots (e.g., timeslots 306 of FIG. 3). Each of the timeslots is pre-assigned to an iBUS message that can carry the interrupt to report a certain power management event (e.g., PCLX, IFF, and BCL). Each PMIC can be pre-assigned one or more timeslots. Table 1 below illustrates an example of an iBUS payload timeslot assignment.

| Timeslot | iBUS Messages |
|---|---|
| 0 | PMIC_1 BCL |
| 1 | PMIC_2 IFF1 |
| 2 | PMIC_2 IFF2 |
| 3 | PMIC_2 IFF3 |
| 4 | PMIC_2 IFF4 |
| 5 | PMIC_2 IFF5 |
| 6 | PMIC_2 IFF6 |
| 7 | PMIC_3 PCLX1 |
| 8 | PMIC_3 PCLX2 |
| 9 | PMIC_3 PCLX3 |
| 10 | PMIC_3 PCLX4 |
| 11 | PMIC_3 PCLX5 |
| 12 | PMIC_3 PCLX6 |

In Table 1, the iBUS payload has 13 timeslots or bit positions. In other examples, the payload can have more or fewer than 13 timeslots. Each timeslot corresponds to one bit of the payload. Each timeslot can carry one iBUS message (e.g., interrupt). In this example, timeslot 0 (first timeslot) is assigned to a first PMIC (PMIC_1), timeslot 1 though timeslot 6 are assigned to a second PMIC (PMIC_2), and timeslot 7 through timeslot 12 are assigned to a third PMIC (PMIC_3). In other examples, the timeslots can be assigned to PMICs using other arrangements. While table 1 shows that contiguous timeslots are assigned to the same PMIC, non-contiguous timeslots can be assigned to the same PMIC. Timeslot 0 is the earliest (first) timeslot in the payload, whereas timeslot 12 is the last timeslot of the payload. An interrupt sent in an earlier timeslot gets a faster interrupt response (e.g., lower interrupt latency) from the SoC than an interrupt sent in a later timeslot in the same payload because the SoC can carry out mitigation before the whole payload is received.

In some aspects, when the SoC's arbiter (e.g., PMIC arbiter 240 of FIG. 2) receives the iBUS messages (e.g., interrupts) via the iBUS, the arbiter can immediately distribute the corresponding interrupts to the limit management blocks (LLMs) of the processing cores as each interrupt is received. Then, the LLM can perform suitable mitigation corresponding to the interrupt (e.g., PCLX, IFF, BCL). The arbiter does not need to wait for the entire iBUS payload to be completely received and decoded. Therefore, interrupt response latency can be minimized, particularly for the first timeslot in the payload. In one example, front-loading the highest priority interrupt (e.g., BCL interrupt) in the first timeslot (e.g., bit 0 of FIG. 3) at the start of the payload can reduce latency to about 170 nanoseconds (ns) for the first bit in the payload, which is significantly faster than the communication latency of the SPMI protocol.

Figure 9:
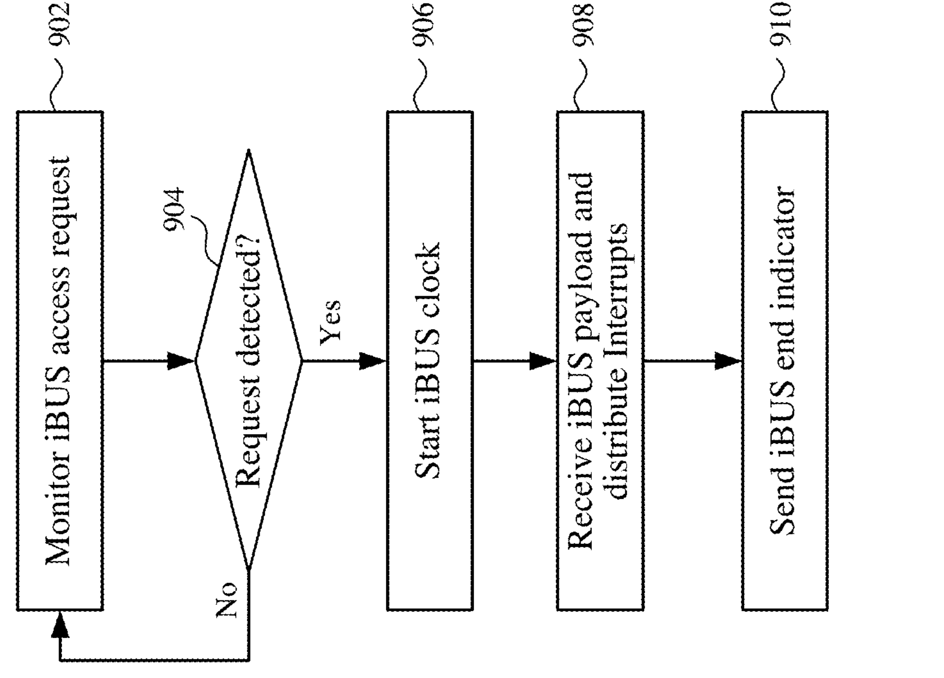
FIG. 9 is a diagram illustrating an exemplary process for receiving an interrupt using the iBUS protocol according to some aspects.

FIG. 9 is a diagram illustrating a process 900 for receiving an interrupt using the iBUS protocol according to some aspects. In some examples, the process 900 may be performed at an SoC (e.g., SoC 202 illustrated in FIG. 2). In some examples, the process 900 may be carried out by any suitable apparatus or means for carrying out the functions or algorithm described below.

At block 902, the SoC can monitor the iBUS for any iBUS access request. As described above, a PMIC can request access to the iBUS by raising the signal level on the iBUS data line (iBUS_SDATA) in a starting request period (e.g., period 308 of FIG. 3). For example, the SoC can use its iBUS master interface (e.g., iBUS-M 226 of FIG. 2) to monitor the iBUS data line. At block 904, the SoC determines whether or not an iBUS access request is detected. For example, the SoC can use the iBUS master interface to determine the signal level on the iBUS data line. A low-to-high transition or a high level signal on the iBUS data line can indicate the iBUS access request.

At block 906, the SoC can start the iBUS clock when the SoC detects a iBUS access request. Otherwise, the SoC can continue to monitor the iBUS. For example, the SoC can use the iBUS mater interface to drive clock pulses on the iBUS clock line (iBUS_SCLK).

At block 908, the SoC can receive the iBUS payload and distribute any interrupts received in the payload. For example, the payload may include one or more interrupts similar to those shown in TABLE 1 above. Multiple interrupts from different PMICs can be captured and combined in a single payload, reducing the chance that a pending interrupt needs to wait for the next iBUS capture window. The SoC's iBUS master interface can send an interrupt of the payload to the PMIC arbiter (e.g., PMIC arbiter 240 of FIG. 2) before the whole payload is received, thus reducing the interrupt latency. For example, the interrupt can be an interrupt for a PCLX, IFF, or BCL power management event. The PMIC arbiter can distribute the interrupt to the corresponding processing core (e.g., cores 204, 206, and 208 of FIG. 2) or its LLM. In response to the interrupt, the LLM of the core can perform shallow mitigation (e.g., PCLX mitigation, IFF mitigation) as described above in relation to FIGS. 6 and 7 to reduce the load on the regulator so as to avoid the need to perform more drastic full mitigation that can significantly impact the performance of the SoC.

At block 910, the SoC can send an iBUS end indicator that indicates the end of the current iBUS cycle or capture window. For example, the SoC's iBUS master interface can send the iBUS end indicator (end indicator 312 of FIG. 3) on the iBUS data line after the payload (e.g., iBIT timeslots 306 of FIG. 3).

FIG. 10 is a diagram illustrating an exemplary method 1000 for operating a bus interface of an apparatus (e.g., SoC) using an iBUS protocol according to some aspects. As described below, some or all illustrated features may be omitted in a particular implementation within the scope of the present disclosure, and some illustrated features may not be required for implementation of all embodiments. In some examples, the method 1000 may be carried out by the SoC 202 illustrated in FIG. 2. In some examples, the method 1000 may be carried out by any suitable apparatus or means for carrying out the functions or algorithm described below.

The process receives an interrupt message from a peripheral device among a plurality of peripheral devices using an interrupt protocol. A payload of the interrupt protocol includes a plurality of timeslots (e.g., TABLE 1) respectively pre-assigned to a plurality of alert events (e.g., power management events) associated with the plurality of peripheral devices. The interrupt message is inserted in a pre-assigned timeslot of the plurality of timeslots corresponding to the alert event of the plurality of alert events. In one aspect, the power circuit of FIG. 4 (e.g., iBUS slave 404) can provide a means to send the interrupt message using the iBUS. In one example, the payload of the interrupt protocol is similar to that described above in relation to FIG. 3. The payload includes a plurality of timeslots 306 of FIG. 3 in a single payload.

In some aspects, the SoC 202 (e.g., iBUS-M 226) of FIG. 2 can provide a means to receive the interrupt message from the peripheral device. In one example, the peripheral device can be any of the PMICs described above in relation to FIG. 2. In some aspects, the interrupt protocol can be the iBUS protocol described above in relation to FIG. 3. In some aspects, the alert events can include a PCLX event, an IFF event, and/or a BCL event.

Figure 11:
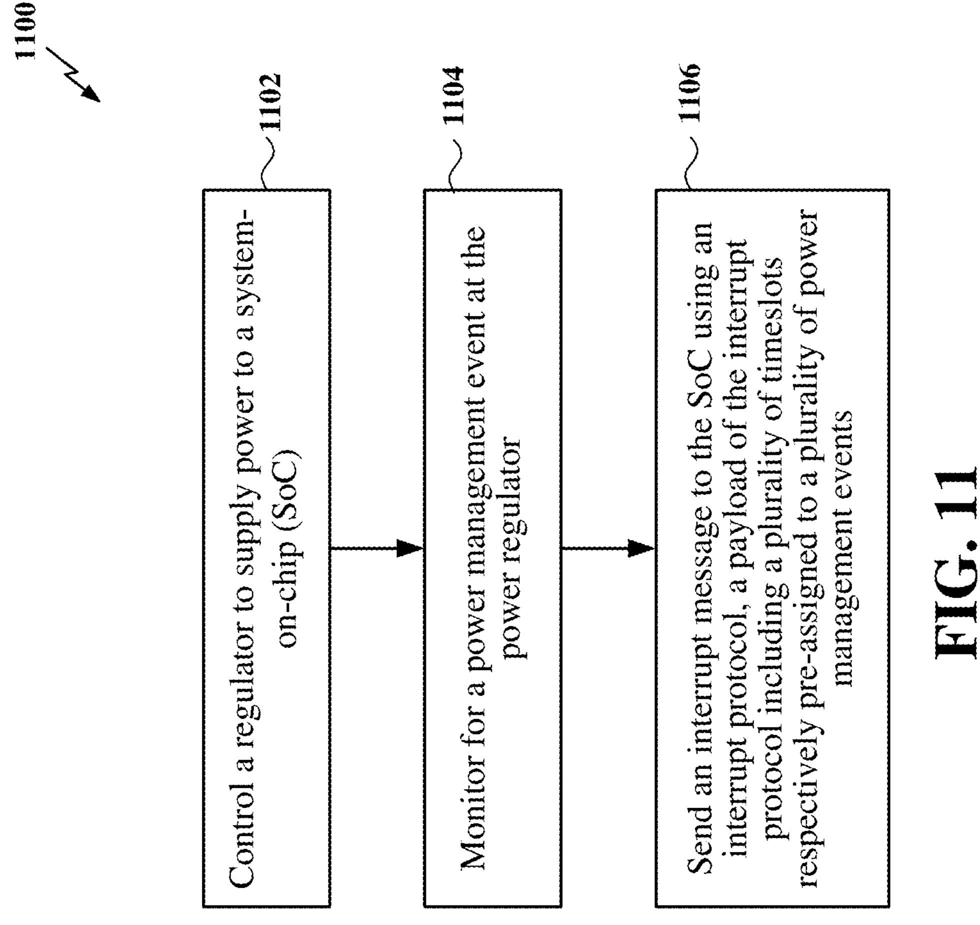
FIG. 11 is a diagram illustrating an exemplary method for mitigating power of an apparatus using an iBUS protocol according to some aspects.

FIG. 11 is a diagram illustrating an exemplary method 1100 for mitigating power of an apparatus using an iBUS protocol according to some aspects. As described below, some or all illustrated features may be omitted in a particular implementation within the scope of the present disclosure, and some illustrated features may not be required for implementation of all embodiments. In some examples, the process 1100 may be carried out by the PMIC 406 illustrated in FIG. 4. In some examples, the process 1100 may be carried out by any suitable apparatus or means for carrying out the functions or algorithm described below.

At block 1102, the process begins with controlling a regulator to supply power to a system-on-chip (SoC). In one aspect, the power regulator may be one or more of the regulators 418 of FIG. 4. For example, the regulator may be a voltage regulator, a FTS buck regulator, etc. In one aspect, the power circuit of FIG. 4 (e.g., power circuits 410, 412, and 414) can provide a means to control the power regulator to supply power to the SoC (e.g., SoC 202 of FIG. 2).

At block 1104, the process continues with monitoring for a power management event at the regulator. In one aspect, the power management event can be the PCLX, IFF, or BCL as described above. The power management event can indicate an event in which the SoC needs to carry out shallow mitigation to lower the load on the regulator to avoid full mitigation. In one aspect, the power circuit of FIG. 4 can provide a means (e.g., current monitor circuitry 420 and foldback monitor circuitry 422 of FIG. 4) to monitor for the power management event.

At block 1106, the process continues with sending an interrupt message to the SoC using an interrupt protocol. A payload of the interrupt protocol includes a plurality of timeslots (e.g., TABLE 1) respectively pre-assigned to a plurality of power management events. The interrupt message is inserted in a pre-assigned timeslot of the payload corresponding to the power management event of the plurality of power management events. In one aspect, the power circuit of FIG. 4 (e.g., iBUS slave 404) can provide a means to send the interrupt message using the iBUS. In one example, the payload of the interrupt protocol is similar to that described above in relation to FIG. 3. The payload includes a plurality of timeslots 306 of FIG. 3 in a single payload.

Of course, in the above examples, the controller is merely provided as an example, and other means for carrying out the described functions may be included within various aspects of the present disclosure, including any other suitable apparatus or means described in any one of the FIGS. 1, 2, 4, and 5, and utilizing, for example, the processes and/or algorithms described herein in relation to FIGS. 2-9.

The Following Provides an Overview of Aspects of the Present Disclosure:

Aspect 1: A system-on-chip (SoC), comprising: one or more processors; and a bus interface connecting between the one or more processors and a plurality of peripheral devices, the bus interface being configured to: receive an interrupt message from a peripheral device among the plurality of peripheral devices using an interrupt protocol, wherein a payload of the interrupt protocol comprises a plurality of timeslots that are respectively pre-assigned to a plurality of alert events associated with the plurality of peripheral devices, and wherein the interrupt message is inserted in a pre-assigned timeslot of the plurality of timeslots corresponding to the alert event among the plurality of alert events.

Aspect 2: The SoC of aspect 1, wherein: the plurality of timeslots are pre-assigned to a plurality of interrupts corresponding to the plurality of alert events; and an earlier timeslot of the plurality of timeslots provides a faster interrupt response from the SoC than a later timeslot of the plurality of timeslots.

Aspect 3: The SoC of aspect 1, wherein the plurality of peripheral devices comprise a plurality of power management integrated circuits (PMICs), and wherein the plurality of timeslots are pre-assigned to respective interrupt messages from the plurality of PMICs, enabling transmission of the interrupt messages in a single capture window of the interrupt protocol.

Aspect 4: The SoC of aspect 1, 2, or 3, wherein the bus interface is further configured to: send a clock signal to the peripheral device; and receive the interrupt message in the pre-assigned timeslot in reference to the clock signal.

Aspect 5: The SoC of aspect 4, wherein the bus interface is further configured to: receive a request from the peripheral device to enable the clock signal in response to the alert event.

Aspect 6: The SoC of aspect 4, wherein the bus interface is further configured to communicate with the peripheral device using a two-wire bus connected between the peripheral device and the SoC, and wherein the two-wire bus comprises a clock line for the clock signal and a data line for the interrupt message.

Aspect 7: The SoC of aspect 1, 2, or 3, wherein the alert event comprises at least one of a pre-current limit extension (PCLX) event, an imminent foldback flag (IFF) event, a battery current limiting (BCL) event.

Aspect 8: The SoC of aspect 1, 2, or 3, wherein the interrupt message is configured to trigger a shallow mitigation at the SoC in response to a time duration greater than a shallow mitigation qualifying period, in the time duration a regulator output of the peripheral device exceeded a current threshold; and wherein the bus interface is further configured to receive, from the peripheral device, a system power management interface (SPMI) message to trigger a full mitigation at the SoC in response to the time duration greater than a full mitigation qualifying period that is longer than the shallow mitigation qualifying period.

Aspect 9: The SoC of aspect 1, 2, or 3, wherein the interrupt message is configured to trigger a shallow mitigation at the SoC in response to a time duration greater than a shallow mitigation qualifying period, in the time duration a regulator output of the peripheral device being lower than a voltage threshold; and wherein the bus interface is further configured to trigger a foldback operation at the regulator in response to the time duration greater than a full mitigation qualifying period that is longer than the shallow mitigation qualifying period.

Aspect 10: A method of operating a bus interface at a system-on-chip (SoC), comprising: receiving an interrupt message from a peripheral device among a plurality of peripheral devices using an interrupt protocol, a payload of the interrupt protocol comprising a plurality of timeslots that are respectively pre-assigned to a plurality of alert events associated with the plurality of peripheral devices, and the interrupt message inserted in a pre-assigned timeslot of the plurality of timeslots corresponding to the alert event among the plurality of alert events.

Aspect 11: The method of aspect 10, wherein: the plurality of timeslots are pre-assigned to a plurality of interrupts corresponding to the plurality of alert events; and an earlier timeslot of the plurality of timeslots provides a faster interrupt response from the SoC than a later timeslot of the plurality of timeslots.

Aspect 12: The method of aspect 10, wherein the plurality of peripheral devices comprise a plurality of power management integrated circuits (PMICs), and wherein the plurality of timeslots are pre-assigned to respective interrupt messages from the plurality of PMICs, enabling transmission of the interrupt messages in a single capture window of the interrupt protocol.

Aspect 13: The method of aspect 10, 11, or 12, further comprising: sending a clock signal to the peripheral device; and receiving the interrupt message in the pre-assigned timeslot in reference to the clock signal.

Aspect 14: The method of aspect 13, further comprising: receiving a request from the peripheral device to enable the clock signal in response to the alert event.

Aspect 15: The method of aspect 13, further comprising: communicating with the peripheral device using a two-wire bus connected between the peripheral device and the SoC, the two-wire bus comprising a clock line for the clock signal and a data line for the interrupt message.

Aspect 16: The method of aspect 10, 11, or 12, wherein the alert event comprises at least one of a pre-current limit extension (PCLX) event, an imminent foldback flag (IFF) event, a battery current limiting (BCL) event.

Aspect 17: The method of aspect 10, 11, or 12, wherein the interrupt message is configured to trigger a shallow mitigation at the SoC in response to a time duration greater than a shallow mitigation qualifying period, in the time duration a regulator output of the peripheral device exceeded a current threshold; the method further comprising: receiving, from the peripheral device, a system power management interface (SPMI) message to trigger a full mitigation at the SoC in response to the time duration greater than a full mitigation qualifying period that is longer than the shallow mitigation qualifying period.

Aspect 18: The method of aspect 10, 11, or 12, further comprising: wherein the interrupt message is configured to trigger a shallow mitigation at the SoC in response to a time duration greater than a shallow mitigation qualifying period, in the time duration a regulator output of the peripheral device being lower than a voltage threshold; the method further comprising: triggering a foldback operation at the regulator in response to the time duration greater than a full mitigation qualifying period that is longer than the shallow mitigation qualifying period.

Aspect 19: An apparatus comprising: a system-on-chip (SoC); and a power management integrated circuit (PMIC), the PMIC is configured to: control a regulator to supply power to the SoC; communicate with the SoC using an interrupt protocol, wherein a payload of the interrupt protocol comprises a plurality of timeslots respectively pre-assigned to a plurality of power management events; and send an interrupt message to the SoC, wherein the interrupt message is inserted in a pre-assigned timeslot of the payload corresponding to a power management event among the plurality of power management events.

Aspect 20: The SoC of aspect 19, wherein: the plurality of timeslots are pre-assigned to a plurality of interrupts corresponding to the plurality of power management events; and an earlier timeslot of the plurality of timeslots provides a faster interrupt response from the SoC than a later timeslot of the plurality of timeslots.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A system-on-chip (SoC), comprising:

one or more processors; and a bus interface connecting between the one or more processors and a plurality of peripheral devices, the bus interface being configured to:

receive an interrupt message from a peripheral device among the plurality of peripheral devices using an interrupt protocol, wherein a payload of the interrupt protocol comprises a plurality of timeslots that are respectively pre-assigned to a plurality of alert events associated with the plurality of peripheral devices, and wherein the interrupt message is inserted in a pre-assigned timeslot of the plurality of timeslots corresponding to an alert event among the plurality of alert events, wherein the alert event comprises at least one of a pre-current limit extension (PCLX) event, an imminent foldback flag (IFF) event, a battery current limiting (BCL) event.

2. The SoC of claim 1, wherein:

the plurality of timeslots are pre-assigned to a plurality of interrupts corresponding to the plurality of alert events; and an earlier timeslot of the plurality of timeslots provides a faster interrupt response from the SoC than a later timeslot of the plurality of timeslots.

3. The SoC of claim 1, wherein the plurality of peripheral devices comprise a plurality of power management integrated circuits (PMICs), and wherein the plurality of timeslots are pre-assigned to respective interrupt messages from the plurality of PMICs, enabling transmission of the interrupt messages in a single capture window of the interrupt protocol.

4. The SoC of claim 1, wherein the bus interface is further configured to:

send a clock signal to the peripheral device; and receive the interrupt message in the pre-assigned timeslot in reference to the clock signal.

5. The SoC of claim 4, wherein the bus interface is further configured to:

receive a request from the peripheral device to enable the clock signal in response to the alert event.

6. The SoC of claim 4, wherein the bus interface is further configured to communicate with the peripheral device using a two-wire bus connected between the peripheral device and the SoC, and wherein the two-wire bus comprises a clock line for the clock signal and a data line for the interrupt message.

7. The SoC of claim 1, wherein the interrupt message is configured to trigger a shallow mitigation at the SoC in response to a time duration greater than a shallow mitigation qualifying period, in the time duration a regulator output of the peripheral device exceeded a current threshold; and wherein the bus interface is further configured to receive, from the peripheral device, a system power management interface (SPMI) message to trigger a full mitigation at the SoC in response to the time duration greater than a full mitigation qualifying period that is longer than the shallow mitigation qualifying period.

8. The SoC of claim 1, wherein the interrupt message is configured to trigger a shallow mitigation at the SoC in response to a time duration greater than a shallow mitigation qualifying period, in the time duration a regulator output of the peripheral device being lower than a voltage threshold; and wherein the bus interface is further configured to trigger a foldback operation at a regulator of the SoC in response to the time duration greater than a full mitigation qualifying period that is longer than the shallow mitigation qualifying period.

9. A method of operating a bus interface at a system-on-chip (SoC), comprising:

receiving an interrupt message from a peripheral device among a plurality of peripheral devices using an interrupt protocol, a payload of the interrupt protocol comprising a plurality of timeslots that are respectively pre-assigned to a plurality of alert events associated with the plurality of peripheral devices, and the interrupt message inserted in a pre-assigned timeslot of the plurality of timeslots corresponding to an alert event among the plurality of alert events, wherein the alert event comprises at least one of a pre-current limit extension (PCLX) event, an imminent foldback flag (IFF) event, a battery current limiting (BCL) event.

10. The method of claim 9, wherein:

the plurality of timeslots are pre-assigned to a plurality of interrupts corresponding to the plurality of alert events; and an earlier timeslot of the plurality of timeslots provides a faster interrupt response from the SoC than a later timeslot of the plurality of timeslots.

11. The method of claim 9, wherein the plurality of peripheral devices comprise a plurality of power management integrated circuits (PMICs), and wherein the plurality of timeslots are pre-assigned to respective interrupt messages from the plurality of PMICs, enabling transmission of the interrupt messages in a single capture window of the interrupt protocol.

12. The method of claim 9, further comprising:

sending a clock signal to the peripheral device; and receiving the interrupt message in the pre-assigned timeslot in reference to the clock signal.

13. The method of claim 12, further comprising:

receiving a request from the peripheral device to enable the clock signal in response to the alert event.

14. The method of claim 12, further comprising:

communicating with the peripheral device using a two-wire bus connected between the peripheral device and the SoC, the two-wire bus comprising a clock line for the clock signal and a data line for the interrupt message.

15. The method of claim 9, wherein the interrupt message is configured to trigger a shallow mitigation at the SoC in response to a time duration greater than a shallow mitigation qualifying period, in the time duration a regulator output of the peripheral device exceeded a current threshold; the method further comprising:

receiving, from the peripheral device, a system power management interface (SPMI) message to trigger a full mitigation at the SoC in response to the time duration greater than a full mitigation qualifying period that is longer than the shallow mitigation qualifying period.

16. The method of claim 9, further comprising:

wherein the interrupt message is configured to trigger a shallow mitigation at the SoC in response to a time duration greater than a shallow mitigation qualifying period, in the time duration a regulator output of the peripheral device being lower than a voltage threshold; the method further comprising:

triggering a foldback operation at a regulator of the SoC in response to the time duration greater than a full mitigation qualifying period that is longer than the shallow mitigation qualifying period.

17. An apparatus comprising:

a system-on-chip (SoC); and a power management integrated circuit (PMIC), the PMIC is configured to:

control a regulator to supply power to the SoC;

communicate with the SoC using an interrupt protocol, wherein a payload of the interrupt protocol comprises a plurality of timeslots respectively pre-assigned to a plurality of power management events; and send an interrupt message to the SoC, wherein the interrupt message is inserted in a pre-assigned timeslot of the payload corresponding to a power management event among the plurality of power management events, wherein the alert event comprises at least one of a pre-current limit extension (PCLX) event, an imminent foldback flag (IFF event, a battery current limiting (BCL) event.

18. The apparatus of claim 17, wherein:

the plurality of timeslots are pre-assigned to a plurality of interrupts corresponding to the plurality of power management events; and an earlier timeslot of the plurality of timeslots provides a faster interrupt response from the SoC than a later timeslot of the plurality of timeslots.

* * * * *